United States Patent [19]

Ichida

[11] 4,143,347

[45] Mar. 6, 1979

[54] TEMPERATURE DETECTOR

[75] Inventor: Shunji Ichida, Kamakura, Japan

[73] Assignee: Honeywell Inc., Minneapolis, Minn.

[21] Appl. No.: 892,565

[22] Filed: Apr. 3, 1978

[30] Foreign Application Priority Data

Apr. 25, 1977 [JP] Japan .............................. 52-51361[U]

[51] Int. Cl.² ............................................. H01C 3/00
[52] U.S. Cl. .................................. 338/28; 338/22 R; 338/30; 338/271
[58] Field of Search .................. 338/22 R, 22 SD, 23, 338/25, 28, 229; 73/362 AR; 29/612, 613

[56] References Cited

U.S. PATENT DOCUMENTS

| | | | |
|---|---|---|---|
| 3,335,382 | 8/1967 | Forbes | 338/22 R |
| 3,832,668 | 8/1974 | Berman | 338/22 SD |
| 3,868,620 | 2/1975 | McBride, Jr. et al. | 338/28 |
| 3,890,588 | 6/1975 | Kanaya et al. | 338/22 R X |

*Primary Examiner*—C. L. Albritton
*Attorney, Agent, or Firm*—John S. Munday

[57] ABSTRACT

A temperature detecting device comprising a protective tube means having a flat inner bottom surface and a top opening end with a resilient metallic member positioned inside the tube for holding a thermistor. The resilient metallic member has a bottom surface essentially parallel to the bottom surface of the protective tube means which is in substantial surface contact with that bottom surface. The metallic member further has a remaining portion essentially perpendicular to the bottom portion and slightly longer than the distance between the bottom surface and the top opening of the tube means. A thin layer of metal, softer than the metal from which the member is made, is positioned between the bottom portion member and the bottom surface of the tube. The thermistor is mounted on the remaining portion of the member. Tube closing means are employed to fit on the top of the opening end of the tube means and are positioned to compress the remaining portion of the member to thereby urge contact between the bottom portion of the member and the bottom surface of the tube.

4 Claims, 2 Drawing Figures

TEMPERATURE DETECTOR

BACKGROUND OF THE INVENTION

Temperature detectors which employ thermistors in operating contact with an environment which is being monitored for temperature has many uses, more particularly in our modern society which is becoming more energy conscious. Protection of the thermistor from that environment, while simultaneously permitting heat transfer on a uniform basis to permit accurate monitoring, is a major concern. This is true particularly when the environment and/or the temperature range is extreme.

When a thermistor is directly soldered onto the inner bottom of a protection tube, the thermistor will be reliably connected to the tube. This, however, is a difficult operation because the silver electrode surface of the thermistor easily reacts with the solder. Moreover, protection tubes are normally formed by cutting and machining metal, which results in a surface which is not completely smooth and uniform. Oxidation can then develop during the use of the device over varying temperature cycles, giving rise to the occurrence of contact resistance.

Accordingly, it is an object of this invention to provide a method for utilizing a thermistor in a protection tube as a sensing device for temperature.

Another object of this invention is to provide a device which is capable of withstanding acyclic temperature changes without damage to the heat transfer apparatus from the protection tube to the thermistor.

Other objects will appear hereinafter.

BRIEF DESCRIPTION OF THE INVENTION

Accordingly, it has been discovered that a temperature device according to the principles of this invention may be provided to accomplish the above and other objects of this invention. Specifically, a protection tube means is provided having a flat inner bottom surface and a top opening end. A resilient metallic member is positioned within the tube means, with the member having a bottom portion essentially parallel to the bottom surface of the tube and in substantial surface contact therewith. The member has a remaining portion which is essentially perpendicular to the bottom portion, slightly longer than the distance between the bottom surface and the top opening of the tube means. A thin layer of metal, softer than the member, is positioned between the bottom portion of the member and the bottom surface to increase contact. A thermistor means is mounted on the remaining portion of the member. Finally, tube closing means are provided to fit on the top of the tube means and positioned to compress the remaining portion of the member to thereby urge contact between the bottom portion of the member and the bottom surface of the tube.

In a preferred embodiment, the bottom portion of the member is split to position the remaining portion of the member relatively centrally in the tube means. Also preferred is to provide the remaining portion of said member with a bifurcated section adapted to permit each bifurcated part to bend in opposite direction to the other upon compression of the member by said closing means. This compression of the bifurcated sections not only assists in maintaining contact between the bottom portion of the member and the bottom surface of the tube but further assists in centering the member within the tube.

In a further preferred embodiment, the thin layer of metal, softer than said member, which is positioned between the bottom portion of the member and the bottom surface of the tube, should be selected from the group consisting of gold, silver, nickel, and solder.

DETAILED DESCRIPTION OF THE INVENTION

Figure 1:
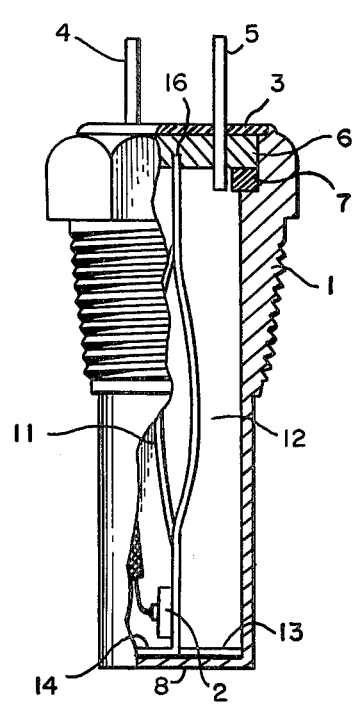
Figure 2:
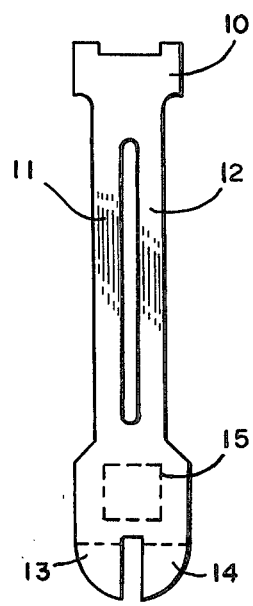

For a more complete understanding of the invention, reference is hereby made to the drawings in which:

FIG. 1 represents a partially cutaway view of the preferred embodiment of the present invention; and FIG. 2 is a view of a novel element used in the embodiment of FIG. 1.

With reference to FIG. 1, the metal plate 10 which forms a resilient metallic member of this invention and to which is joined the thermistor 2 is studded in a notch of an insulation plate 3 and inserted into the protection tube 1. A pair of terminals 4 and 5 are studded on the insulation plate 3, one terminal 4 being connected to the thermistor 2 and the other terminal 5 being connected to the protection tube 1 through a conductor 6. When an opening port of the protection tube 1 is closed with the insulation plate 3 via a packing 7, the metallic plate or member 10 is urged into contact between the bottom portion of the member and the bottom surface of the tube.

As shown in FIG. 2, the metallic resilient member 10 is formed from a piece of resilient metal plate by means of a punch press, a casting, or such. In the central part of the plate 10, a plate is divided into two paths defining a bifurcated section to form pieces 11 and 12. The bottom portion of the member 10 is formed by folding pieces 13 and 14 into opposite directions such that they are perpendicular to the remaining portion of the member 10. When the packing 7 is closed with the insulation plate 3, the resilient nature of the metallic member forces pieces 13 and 14 into close contact with the bottom of the tube 1. The bifurcated portions 11 and 12 of the member 10 are curved in the shape of bows in the opposite direction to one another, thereby providing a uniform and permanent pressure while simultaneously permitting centering of the force against the bottom portions 13 and 14. The thermistor itself is mounted in the member 10 at the area shown by dotted line 15.

In order to obtain maximum contact between the metal plate 10 and the inner bottom surface of the tube 1, an electroplating 8 of a metal softer than the metal plate 10 is employed, either on the inner bottom surface of the tube or on the surface pieces 13 and 14 of the metal plate 10 contacting the bottom of the tube. Metals such as gold, silver, nickel, solder, and other metals which are softer than the metal plate 10 may be employed. The metal plate 10 is made of a resilient material such as, for example, the metals used for blades of switches, and does not have the ability to provide sufficient contact between its inner bottom surfaces of protection tube 1. Therefore, an electroplating of a soft metal, and particularly one which does not oxidize, permits the contacting pressure from the bifurcated portions of 11 and 12 of the member to force the areas 13 and 14 into contact with the electroplating 8 to ensure uniform and permanent contact with the bottom of the tube 1.

Temperature detectors built under the principles of this invention have been manufactured and employed in tests over substantial temperature variations. Since the effective contacting area remains constant, no variation in operating characteristics were detected and the device was found to be satisfactory and essentially trouble free.

Having thus described the invention, what is claimed is:

1. A temperature detecting device comprising:
   a protective tube means having a flat inner bottom surface and a top opening end;
   a resilient metallic member positioned within said tube means, said member having a bottom portion essentially parallel to said bottom surface of said tube means and in substantial surface contact therewith, said member having the remaining portion essentially perpendicular to said bottom portion and slightly longer than the distance between the bottom surface and the top opening end of said tube;
   a thin layer of metal, softer than said member, positioned between said bottom portion of said member and said bottom surface of said tube;
   a thermistor means mounted on said remaining portion of said member; and
   a tube closing means adapted to fit on said top opening end of said tube means, positioned to compress the remaining portion of said member to thereby urge contact between said bottom portion of said member and bottom surface of said tube means.

2. The device of claim 1 wherein said bottom portion of said member is split to position said remaining portion relatively centrally in said tube means.

3. The device of claim 1, wherein said remaining portion of said member includes a bifurcated section adapted to permit each bifurcated part to bend in opposite direction to the other upon compression of said member by said tube closing means.

4. The device of claim 1, wherein said thin layer of metal, softer than said member, selected from the group consisting of gold, silver, nickel, and solder.

* * * * *